US012739959B2

(12) United States Patent
Ke et al.

(10) Patent No.: US 12,739,959 B2
(45) Date of Patent: Sep. 15, 2026

(54) LIGHT TUBE CIRCUIT FOR SWITCHING BETWEEN EMERGENCY LIGHTING AND GENERAL LIGHTING

(71) Applicant: SHENZHEN BILLDA TECHNOLOGY CO., LTD, Shenzhen (CN)

(72) Inventors: Jianjun Ke, Shenzhen (CN); Xiaobing Liu, Shenzhen (CN); Peizhi Chen, Shenzhen (CN); Qiu Feng, Shenzhen (CN)

(73) Assignee: SHENZHEN BILLDA TECHNOLOGY CO., LTD, Shenzhen (CN)

( * ) Notice: Subject to any disclaimer, the term of this patent is extended or adjusted under 35 U.S.C. 154(b) by 33 days.

(21) Appl. No.: 18/825,041

(22) Filed: Sep. 5, 2024

(65) Prior Publication Data

US 2026/0046992 A1 Feb. 12, 2026

(30) Foreign Application Priority Data

Aug. 7, 2024 (CN) ........................ 202411079255.1

(51) Int. Cl.
*H05B 47/29* (2020.01)
*H05B 45/50* (2022.01)

(52) U.S. Cl.
CPC ............. *H05B 47/29* (2020.01); *H05B 45/50* (2020.01)

(58) Field of Classification Search
CPC ................................ H05B 47/29; H05B 45/50
See application file for complete search history.

(56) References Cited

U.S. PATENT DOCUMENTS

2012/0262093 A1* 10/2012 Recker .................. H05B 45/20
315/307

* cited by examiner

*Primary Examiner* — Henry Luong
(74) *Attorney, Agent, or Firm* — HOWARD M COHN and Associates, LLC

(57) ABSTRACT

Disclosed is a light tube circuit for switching between emergency lighting and general lighting, comprising a main control module, wherein one terminal of the main control module is connected to a mains supply and a battery, and the other terminal of the main control module is connected to a light-emitting element. Logic judgment is realized by the main control module, and in a case where the mains supply can supply power normally, the main control module controls the light-emitting element to operate in a general lighting mode; and in case of an outage of the mains supply, the main control module controls the battery to supply power to a light tube to realize emergency lighting when the mains supply cannot supply power normally, thus satisfying usage requirements of users.

9 Claims, 8 Drawing Sheets

LIGHT TUBE CIRCUIT FOR SWITCHING BETWEEN EMERGENCY LIGHTING AND GENERAL LIGHTING

BACKGROUND OF THE INVENTION

1. Technical Field

The disclosure relates to the field of lighting circuits, in particular to a light tube circuit for switching between emergency lighting and general lighting.

2. Description of Related Art

Light-emitting diode (LED) tubes are lighting equipment using LEDs as a light source. Compared with traditional fluorescent tubes, the LED tubes have the advantages of higher energy efficiency, longer service life, shorter response time and lower maintenance cost.

Existing LED tubes adopt only one functional circuit, that is, the mains voltage is used as power supplied to LED elements to realize lighting. However, it is found, in actual use, that once a power outage occurs, the LED tubes will not be able to realize emergency lighting. The user experience is poor due to the single function of the circuit adopted by LED lights in the prior art. In view of this, a more reasonable scheme is urgently needed to solve this technical problem.

BRIEF SUMMARY OF THE INVENTION

The disclosure provides a solution to the technical problem that LED tubes in the prior art only use a mains supply as a startup power supply and cannot realize emergency lighting once a power outage occurs.

To fulfill the above purpose, the disclosure provides a light tube circuit for switching between emergency lighting and general lighting, comprising a main control module, wherein the main control module has a terminal connected to a mains supply and a battery, as well as a terminal connected to a light-emitting element;

the main control module is used for determining whether an input voltage of the mains supply satisfies a desired driving requirement; if so, the main control module controls the light-emitting element to start in a general lighting mode;

if not, the control module controls the light-emitting element to start in an emergency lighting mode with the battery as a driving power supply.

Wherein, a rectifier module is arranged between the main control module and the mains supply and is used for converting the voltage of the mains supply into a driving voltage suitable for the light-emitting element.

Wherein, the main control module comprises a main control chip, the rectifier module comprises a transformer and a transformer chip, an output terminal of the mains supply and a regulation pin of the transformer chip are connected to a first transformer coil T1A of the transformer, and a second transformer coil of the transformer is coupled to a first driving control pin of the main control chip.

Wherein, the light tube circuit for switching between emergency lighting and general lighting further comprises a first field-effect transistor, wherein a source of the first field-effect transistor is coupled to the second transformer coil T2E of the transformer, a gate of the first field-effect transistor is connected to the first driving control pin, and a drain of the first field-effect transistor is sequentially connected to a first inductor and the battery.

Wherein, the light tube circuit for switching between emergency lighting and general lighting further comprises a second inductor and a first MOS transistor, wherein the second inductor has a terminal coupled to the second transformer coil T2E of the transformer as well as a terminal connected to a drain of the first MOS transistor, a source of the first MOS transistor is coupled to SGND, and a gate of the first MOS transistor is coupled to a second driving control pin of the main control chip.

Wherein, the light tube circuit for switching between emergency lighting and general lighting further comprises a first triode and a second triode which are located between the second driving control pin and the first MOS transistor, wherein a base of the first triode and a base of the second triode are connected to the second driving control pin, an emitter of the first triode and an emitter of the second triode are connected to the gate of the first MOS transistor, a collector of the first triode is coupled to VDD, and a collector of the second triode is coupled to SGND.

Wherein, the light tube circuit for switching between emergency lighting and general lighting further comprises a second MOS transistor and a third MOS transistor, wherein a source of the second MOS transistor and a source of the third MOS transistor are coupled to the drain of the first MOS transistor, a drain of the second MOS transistor is coupled to a first electrode, a gate of the second MOS transistor is couped to a first dimming pin of the main control chip, a drain of the third MOS transistor is coupled to a second electrode, and a gate of the third MOS transistor is coupled to a second dimming pin of the main control chip.

Wherein, the light tube circuit for switching between emergency lighting and general lighting further comprises a secondary control chip U3, wherein a linkage control pin of the secondary control chip U3 is coupled to a cooperative control pin of the main control chip, an input terminal of the secondary control chip U3 is connected to multiple keys, and an output terminal of the secondary control chip U3 is connected to the light-emitting element.

Wherein, the light tube circuit for switching between emergency lighting and general lighting further comprises a circuit breaker, wherein the circuit breaker has a terminal coupled to the mains supply as well as a terminal coupled to a first optical relay; the second transformer coil of the transformer is coupled to a second optical relay, and the first optical relay and the second optical relay are matched and connected with each other.

Wherein, the light tube circuit for switching between emergency lighting and general lighting further comprises an electric quantity protection module coupled to the battery, wherein the electric quantity protection module is used for detecting the electric quantity of the battery, and when the electric quantity of the battery is lower than a preset threshold, the battery is disconnected from the main control module.

The disclosure has the following beneficial effects: compared with the prior art, the light tube circuit for switching between emergency lighting and general lighting provided by the disclosure comprises a main control module, wherein one terminal of the main control module is connected to a mains supply and a battery, and the other terminal of the main control module is connected to a light-emitting element; the main control module is used for determining whether an input voltage of the mains supply satisfies a desired driving requirement; if so, the main control module controls the light-emitting element to start in a general lighting mode; if not, the control module controls the light-emitting element to start in an emergency lighting mode with the battery as a driving power supply; logic judgment is realized by the main control module, and in a case where the mains supply can supply power normally, the main control module controls the light-emitting element to operate in the general lighting mode; and in case of an outage of the mains supply, the main control module controls the battery to supply power to a light tube to realize emergency lighting when the mains supply cannot supply power normally, thus satisfying usage requirements of users.

DETAILED DESCRIPTION OF THE INVENTION

To more clearly explain the disclosure, the disclosure is further described below in conjunction with accompanying drawings.

Details of some embodiments are given in the following description to provide a deeper understanding of the disclosure. Obviously, the embodiments in the following description are merely illustrative ones, and are not all possible ones of the disclosure. It should be understood that the following specific embodiments are merely used for explaining the disclosure rather than limiting the disclosure.

It should be understood that terms "include" and/or "comprise" used in the description are intended to indicate the presence of features, entireties, steps, operations, elements or modules referred to, and do not exclude the presence or addition of one or more other features, entireties, steps, operations, elements, modules or combinations thereof.

Figure 1:
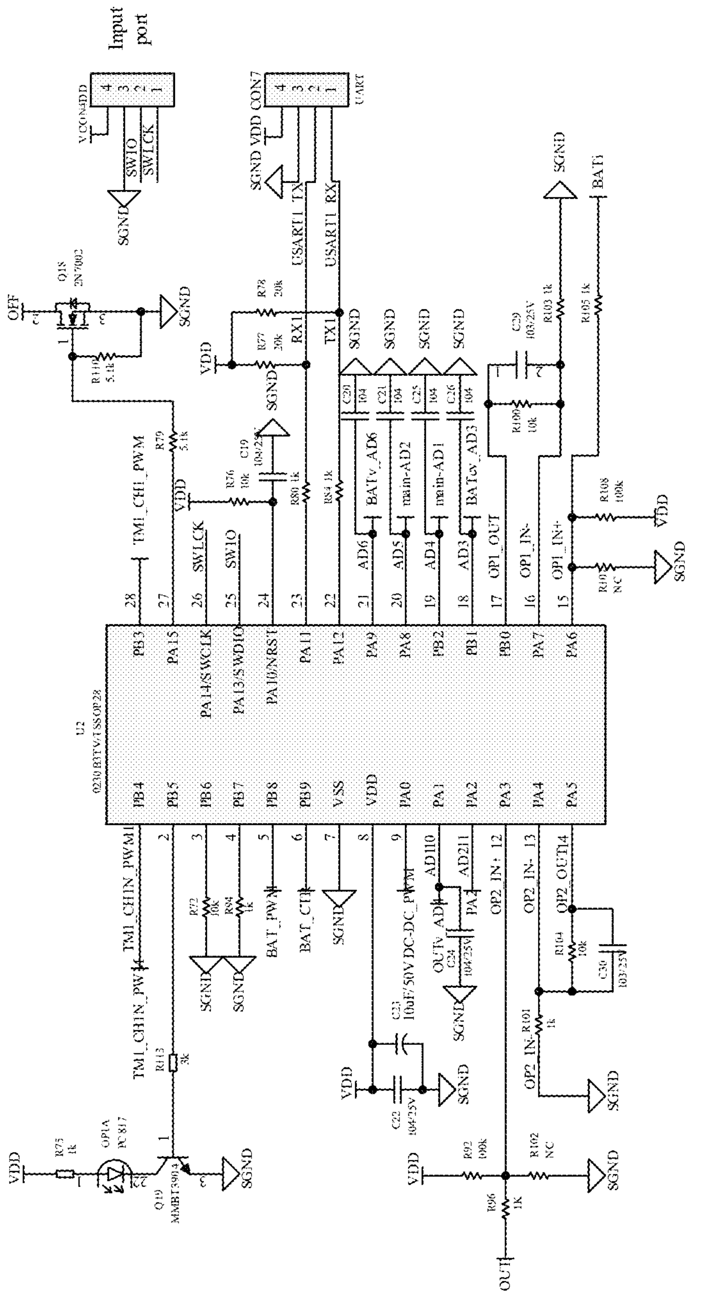
FIG. 1 is a circuit diagram of a main control chip according to the disclosure.
Figure 2:
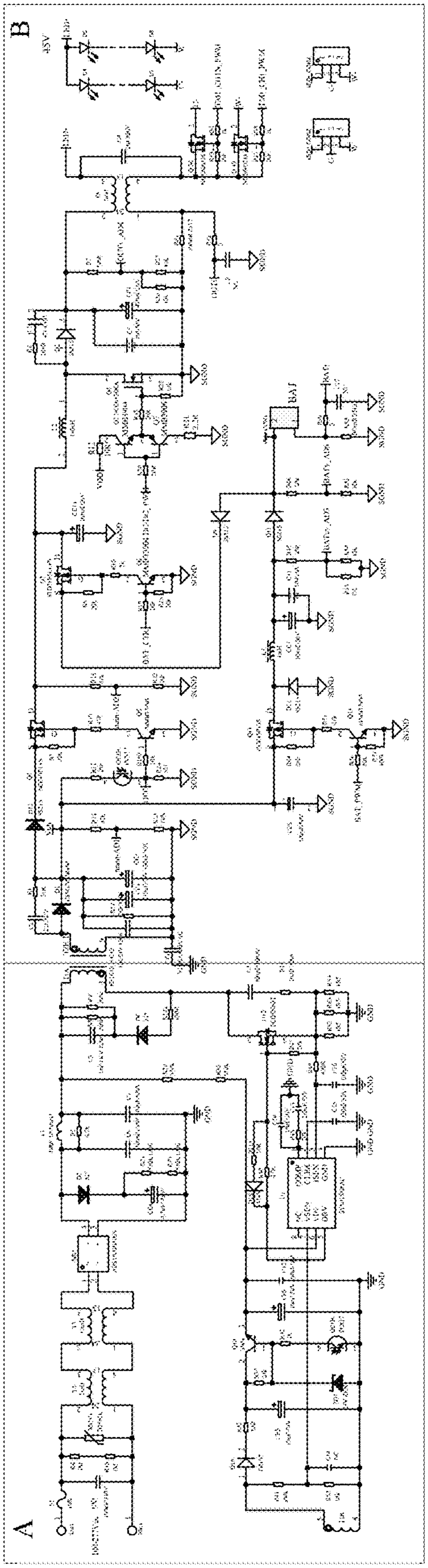
FIG. 2 is a circuit diagram of a rectifier module according to the disclosure.
Figure 3:
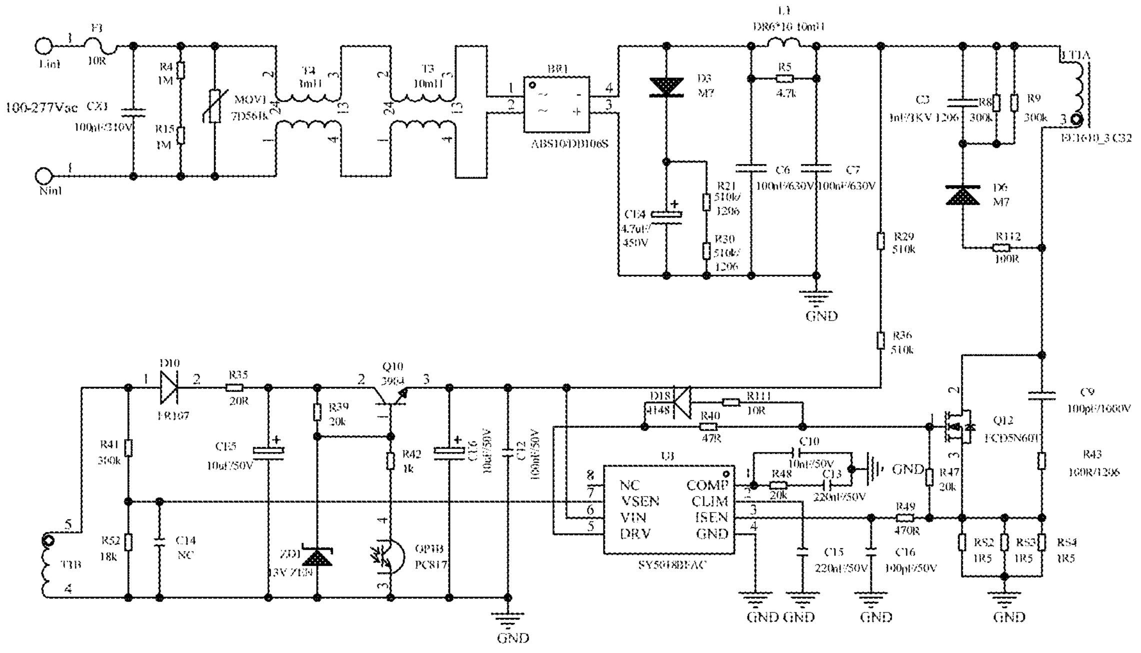
FIG. 3 is a partial enlarged view of area A in FIG. 2 according to the disclosure.
Figure 4:
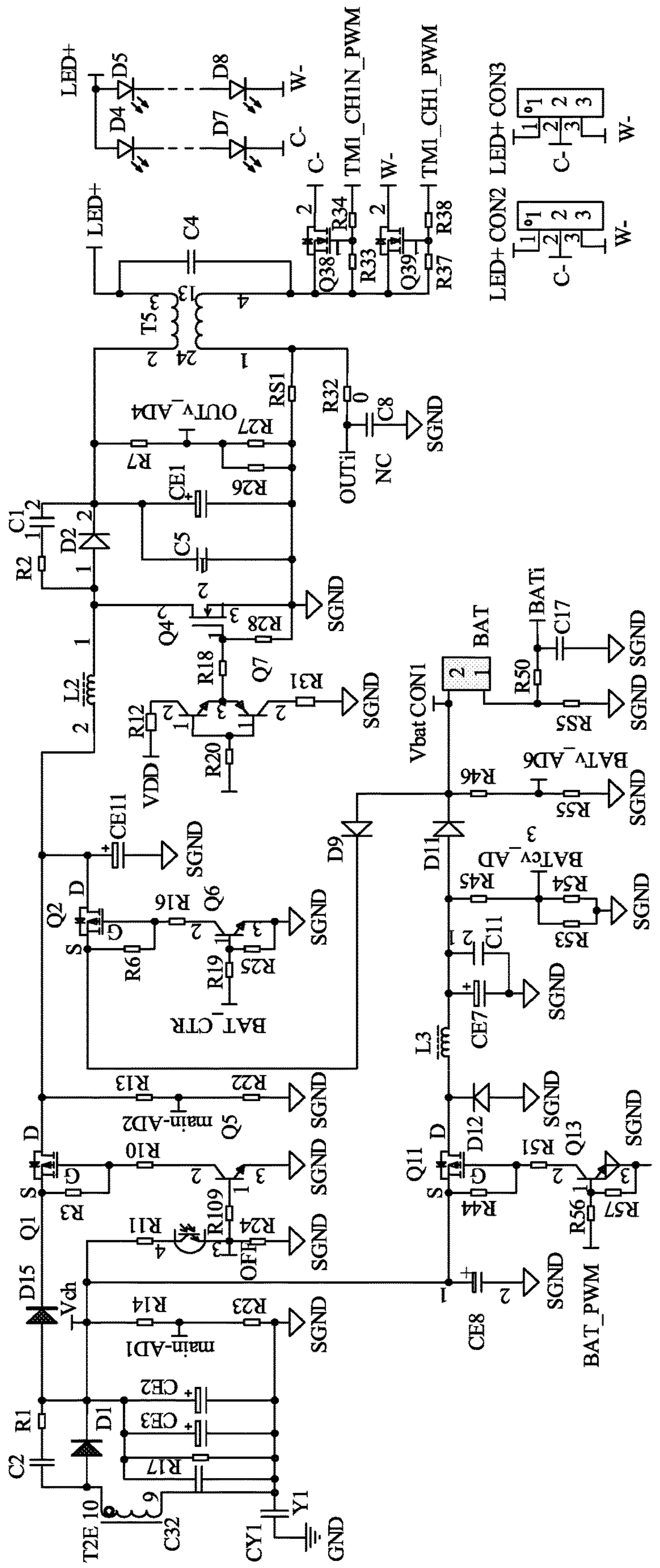
FIG. 4 is a partial enlarged view of area B in FIG. 2 according to the disclosure.
Figure 5:
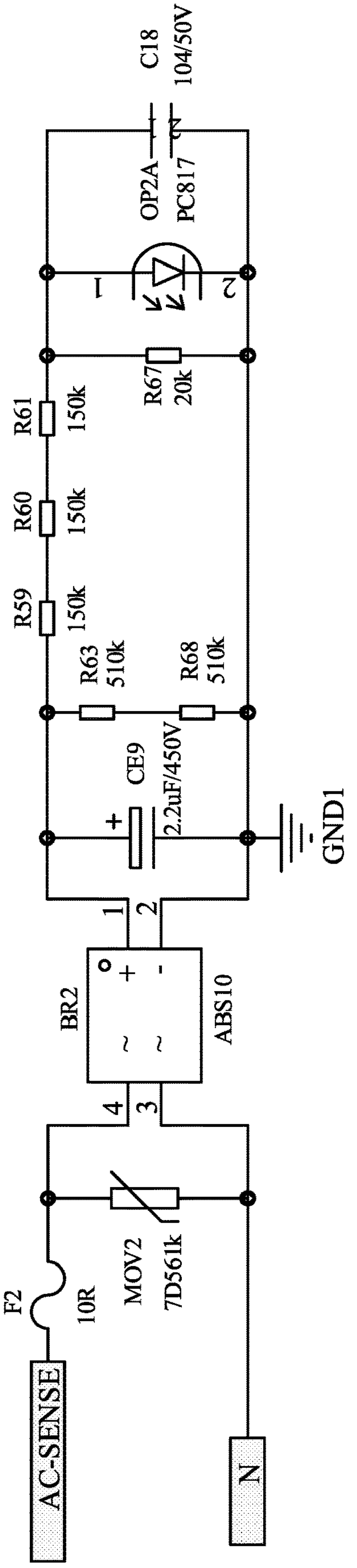
FIG. 5 is a circuit diagram of a circuit breaker according to the disclosure.
Figure 6:
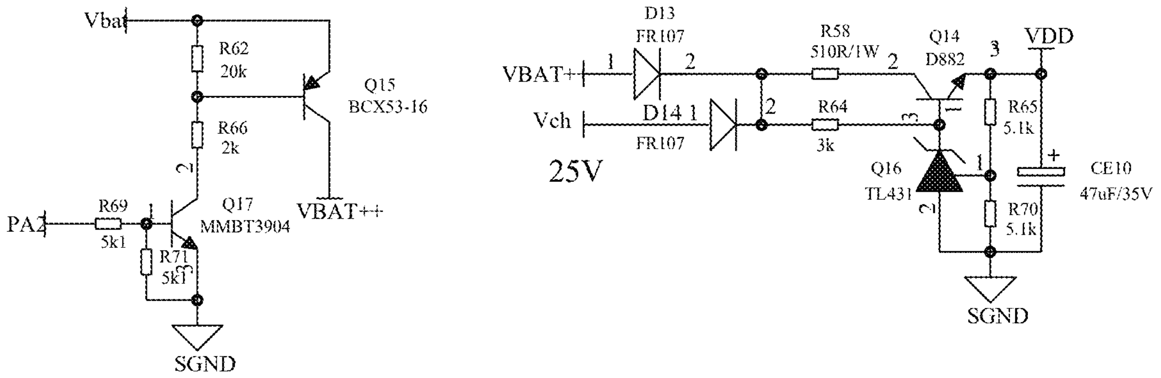
FIG. 6 is a circuit diagram of an electric quantity detection module according to the disclosure.
Figure 7:
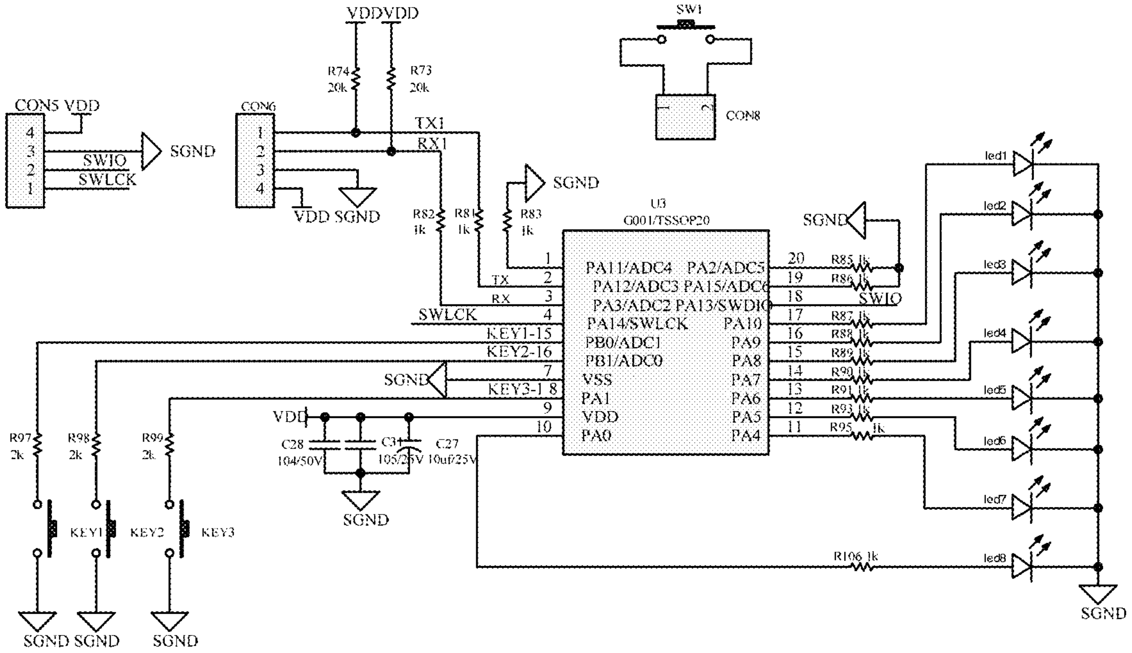
FIG. 7 is a circuit diagram of a secondary control chip U3 according to the disclosure.
Figure 8:
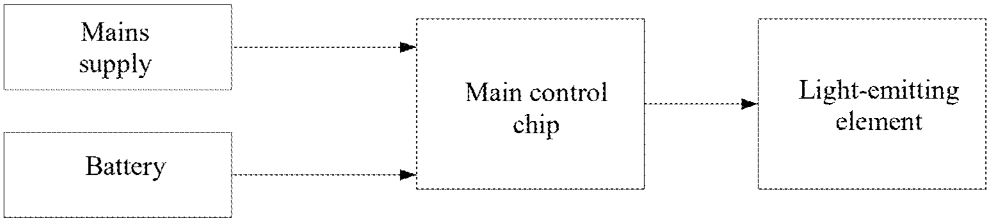
FIG. 8 is a frame diagram of the disclosure.

To solve the technical problem in the prior art, the application provides a light tube circuit for switching between emergency lighting and general lighting. Referring to FIGS. 1-8, the light tube circuit for switching between emergency lighting and general lighting comprises a main control module, wherein one terminal of the main control module is connected to a mains supply and a battery, and the other terminal of main control module is connected to a light-emitting element;

- the main control module is used for determining whether an input voltage of the mains supply satisfies a desired driving requirement; if so, the main control module controls the light-emitting element start in a general lighting mode;
- if not, the control module controls the light-emitting element to start in an emergency lighting mode with the battery as a driving power supply.

It can be understood that the power of a light tube in an emergency lighting mode is different from the power of the light tube in a general lighting mode. For example, in the general lighting mode, the power of the light tube is 100% of a load power; and in the emergency lighting mode, because the battery is used to drive the light tube and the electric quantity of the battery is limited, in order to prolong the power supply time, the power of the light tube is set to be 30-50% of the load power to adapt to a power outage scenario. In this way, logic judgment is realized by the main control module, and in a case where the mains supply can supply power normally, the main control module controls the light-emitting element to operate in the general lighting mode; and in case of an outage of the mains supply, the main control module controls the battery to supply power to a light tube to realize emergency lighting when the mains supply cannot supply power normally, thus satisfying usage requirements of users.

In one embodiment, a rectifier module is arranged between the main control module and the mains supply and is used for converting the voltage of the mains supply into a driving voltage suitable for the light-emitting element. It can be easily understood that the voltages of alternating currents are different in different countries, and to adapt to mains supplies with different voltages, the rectifier module is used to regulate the voltage of the mains supply, and then the regulated voltage is supplied to the light-emitting module by means of the circuit, such that the light-emitting element can obtain a suitable driving voltage.

In a specific scheme, referring to FIGS. 1-4, the main control module comprises a main control chip U2, wherein the model of the main control chip U2 is 0230B3TV/TSSOP28; the rectifier module comprises a transformer and a transformer chip U1, and the model of the transformer chip U1 is SY5018BFAC; and an output terminal of the mains supply and a regulation pin (pin 3 in FIG. 3) of the transformer chip U1 are connected to a first transformer coil T1A of the transformer, and a second transformer coil of the transformer is coupled to a first driving control pin (pin 5 in FIG. 1) of the main control chip U2. The transformer chip U1 works together with the transformer to convert voltage parameters of the mains supply into suitable voltage parameters, and then, the light-emitting element is accurately driven to operate under the control of the main control chip U2.

Specifically, in an emergency driving circuit scheme, the light tube circuit for switching between emergency lighting and general lighting further comprises a first field-effect transistor Q11, wherein a source of the first field-effect transistor Q11 is coupled to the second transformer coil T2E of the transformer, a gate of the first field-effect transistor Q11 is connected to the first driving control pin, and a drain of the first field-effect transistor Q11 is sequentially connected to a first inductor L3, a first diode D11 and the battery. It can be easily understood that the main control chip acquires the capacity of the battery; when the electric quantity of the battery is lower than a preset threshold, the main control chip sends a charging signal instruction to activate a switching triode Q13 connected to the first field-effect transistor Q11, and then the first field-effect transistor Q11 is activated to allow the second transformer coil T2E to form a charging current, which unidirectionally flows into the battery, such that the battery is charged. That is, in practical work, the main control chip outputs a corresponding PWM signal, the PWM signal is transmitted to the switching triode Q13, then the switching triode Q13 controls the first field-effect transistor Q11 to work to turn on a charging circuit to allow power from the mains supply to flow to the battery to charge the battery, and the first diode D11 ensures that power flows unidirectionally.

It is found in actual use that considering the transportation of the battery and the overall size of a light tube, an output high voltage cannot be directly used. So, in this embodiment, the light tube circuit for switching between emergency lighting and general lighting further comprises a second inductor L2 and a first MOS transistor Q4, wherein one terminal of the second inductor L2 is coupled to the second transformer coil T2E of the transformer and a branch of the battery, the other terminal of the second inductor L2 is connected to a drain of the first MOS transistor Q4, a source of the first MOS transistor Q4 is coupled to SGND, and a gate of the first MOS transistor Q4 is coupled to a second driving control pin (pin 9 in FIG. 1) of the main control chip U2. It can be easily understood that a booster circuit is formed by the first MOS transistor Q4 to obtain a desired voltage to drive the light-emitting element, such that the light-emitting element is driven finally.

In a further scheme, the light tube circuit for switching between emergency lighting and general lighting further comprises a first triode Q3 and a second triode Q7 which are located between the second driving control pin and the first MOS transistor Q4, wherein a base of the first triode Q3 and a base of the second triode Q7 are connected to the second driving control pin, an emitter of the first triode Q3 and an emitter of the second triode Q7 are connected to the gate of the first MOS transistor Q4, a collector of the first triode Q3 is coupled to VDD, and a collector of the second triode Q7 is coupled to SGND. It can be easily understood that by means of such a circuit configuration, the first triode Q3 and the second triode Q7 can quickly push the first MOS transistor Q4 to work to quickly generate a suitable operating voltage to drive the light-emitting element.

In this embodiment, the light tube circuit for switching between emergency lighting and general lighting further comprises a second MOS transistor Q8 and a third MOS transistor Q9, wherein a source of the second MOS transistor Q8 and a source of the third MOS transistor Q9 are coupled to the drain of the first MOS transistor Q4, a drain of the second MOS transistor Q8 is coupled to a first electrode C−, a gate of the second MOS transistor Q8 is couped to a first dimming pin (pin 1 in FIG. 1) of the main control chip U2, a drain of the third MOS transistor Q9 is coupled to a second electrode W−, and a gate of the third MOS transistor Q9 is coupled to a second dimming pin (pin 28 in FIG. 1) of the main control chip U2. It can be understood that wiring electrodes of a light tube adopting the circuit in the application are two negative electrodes and one positive electrode, the operation time of the second MOS transistor Q8 and the third MOS transistor Q9 is controlled by the PWM technique, and then the color temperature of light is adjusted according to on/off of the second MOS transistor Q8 and the third MOS transistor Q9 to realize pure white light, warm white light, warm yellow light or other operating modes, such that users can obtain more diversified usage modes.

In case of emergency lighting, electronic elements operate as follows: because the mains supply cannot supply power normally, a circuit path for providing a voltage at this moment is the battery branch connected to the second inductor L2, a fifth MOS transistor Q2 connected to the battery branch is turned on to allow the subsequent circuit to be activated correspondingly, the second driving control pin of the main control chip outputs a corresponding triggering level to trigger the first MOS transistor Q4, the first MOS transistor Q4 quickly pulls up electrical parameters under the push-pull effect of the first triode Q3 and the second triode Q7, that is, a pull-up circuit is formed to pull the first MOS transistor Q4, then a desired voltage is output to drive the light-emitting element, and at this moment, the power of the light-emitting element is 30-50% of the rated power to prolong the lighting time; and based on the light-emitting element, the duty cycle of the second driving control pin of the main control chip can be adjusted to realize a desired color temperature of the light-emitting element together with the second MOS transistor Q8 and the third MOS transistor Q9. In case of general lighting, a suitable voltage is generated by the second transformer coil T2 of the transformer to activate the fourth MOS transistor Q1, which in turn makes the first MOS transistor Q1 quickly pull up electrical parameters by means of the first triode Q3 and the second triode Q7 to realize lighting, and at this moment, the power of the light-emitting element is 100% of the rated power; and to guarantee normal use of users, based on the light-emitting element, the duty cycle of the second driving control pin of the main control chip can be adjusted to realize a desired color temperature of the light-emitting element together with the second MOS transistor Q8 and the third MOS transistor Q9.

In this embodiment, the light tube circuit for switching between emergency lighting and general lighting further comprises a secondary control chip U3, wherein the model of the secondary control chip U3 is G001/TSSOP20, a linkage control pin (pin 4 in FIG. 7) of the secondary control chip U3 is coupled to a cooperative control pin (pin 26 in FIG. 1) of the main control chip U2, an input terminal of the secondary control chip U3 is connected to multiple keys, and an output terminal of the secondary control chip U3 is connected to the light-emitting element. Because the light structure is generally a strip structure, all wires are connected by means of the main control chip U2 and then the keys are led out of a light housing, wiring is complex and difficult for technicians. In view of this, in the aspect of structure, a main control panel with the main control chip U1 and a secondary control panel with the secondary control chip U3 are arranged at two ends of the light-emitting element respectively, the main control chip and the secondary control chip U3 are electrically connected, and multiple keys are connected to the secondary control chip U3, such that the arrangement of the keys is reasonably optimized, the assembly efficiency of technicians can be effectively improved, and the assembly performance is improved; and the keys are mainly used for color temperature control, power setting, emergency tests or the like.

In this embodiment, the light tube circuit for switching between emergency lighting and general lighting further comprises a circuit breaker BR2, wherein one terminal of the circuit breaker BR2 is coupled to the mains supply, and the other terminal of the circuit breaker BR2 is coupled to a first optical relay OP2A; the second transformer coil of the transformer is coupled to a second optical relay OP2B, and the first optical relay OP2A and the second optical relay OP2B are matched and connected with each other. In actual use, in a case where the mains supply cannot supply power normally, the emergency lighting mode is not needed if the light is sufficient; the emergency lighting function is enabled or disabled by means of the circuit breaker BR2; when the circuit breaker is in an on state, the first optical relay sends corresponding information to enable the second optical relay to work so as to control the first field-effect transistor Q11 and the first MOS transistor in the circuit in the emergency lighting mode to work; and when the circuit breaker is in an off state, the emergency lighting mode is disabled, and the light-emitting element is directly turned on or off by means of a wall switch.

In this embodiment, the light tube circuit for switching between emergency lighting and general lighting further comprises an electric quantity protection module with two terminals coupled to the main control chip U1 and the battery respectively, wherein the electric quantity protection module is used for detecting the electric quantity of the battery, and when the electric quantity of the battery is lower than a preset threshold, the battery is disconnected from the main control module U2. In a specific scheme, the electric quantity protection module comprises a third triode Q17, wherein a base of the third triode Q17 is connected to a voltage detection pin (pin 11 in FIG. 1) of the main control chip U2, an emitter of the third triode Q17 is coupled to SGND, a collector of the third triode Q17 is coupled to a base and an emitter of a fourth triode Q15 and is then connected to the battery, and a collector of the fourth triode Q15 is coupled to VBAT++. Specifically, after the main control chip U2 detects the capacity of the battery, if the electric quantity of the battery reaches an under-voltage threshold, the main control chip controls the third triode Q17 to control the fourth triode Q15 to be turned on or off, such that the battery can be completely disconnected to prevent a fault caused by continuous discharge.

The disclosure has the following advantages:

1. Logic judgment is realized by the main control module, and in a case where the mains supply can supply power normally, the main control module controls the light-emitting element to operate in the general lighting mode; and in case of an outage of the mains supply, the main control module controls the battery to supply power to a light tube to realize emergency lighting when the mains supply cannot supply power normally, thus satisfying usage requirements of users;
2. The operation time of the second MOS transistor and the third MOS transistor is controlled by the PWM technique, and then the color temperature of light is adjusted according to on/off of the second MOS transistor and the third MOS transistor to realize pure white light, warm white light, warm yellow light or other operating modes, such that users can obtain more diversified usage modes.

Several specific embodiments of the disclosure are disclosed above, but the disclosure is not limited to the above embodiments. Any variations that can be obtained by those skilled in the art should also fall within the protection scope of the disclosure.

What is claimed is:

1. A light tube circuit for switching between emergency lighting and general lighting, comprising a main control module, wherein the main control module has a terminal connected to a mains supply and a battery, as well as a terminal connected to a light-emitting element;

the main control module is used for determining whether an input voltage of the mains supply satisfies a desired driving requirement; if so, the main control module controls the light-emitting element to start in a general lighting mode;

if not, the control module controls the light-emitting element to start in an emergency lighting mode with the battery as a driving power supply;

wherein a rectifier module is arranged between the main control module and the mains supply and is used for converting the voltage of the mains supply into a driving voltage suitable for the light-emitting element;

wherein the main control module comprises a main control chip, the rectifier module comprises a transformer and a transformer chip, an output terminal of the mains supply and a regulation pin of the transformer chip are both connected to a first transformer coil TIA of the transformer, and a second transformer coil of the transformer is coupled to a first driving control pin of the main control chip.

2. The light tube circuit for switching between emergency lighting and general lighting according to claim 1, further comprising a first field-effect transistor, wherein a source of the first field-effect transistor is coupled to the second transformer coil T2E of the transformer, a gate of the first field-effect transistor is connected to the first driving control pin, and a drain of the first field-effect transistor is sequentially connected to a first inductor and the battery.

3. The light tube circuit for switching between emergency lighting and general lighting according to claim 2, further comprising a second inductor and a first MOS transistor, wherein the second inductor has a terminal coupled to the second transformer coil T2E of the transformer as well as a terminal connected to a drain of the first MOS transistor, a source of the first MOS transistor is coupled to SGND, and a gate of the first MOS transistor is coupled to a second driving control pin of the main control chip.

4. The light tube circuit for switching between emergency lighting and general lighting according to claim 3, further comprising a first triode and a second triode which are located between the second driving control pin and the first MOS transistor, wherein a base of the first triode and a base of the second triode are connected to the second driving control pin, an emitter of the first triode and an emitter of the second triode are connected to the gate of the first MOS transistor, a collector of the first triode is coupled to VDD, and a collector of the second triode is coupled to SGND.

5. The light tube circuit for switching between emergency lighting and general lighting according to claim 4, further comprising a second MOS transistor and a third MOS transistor, wherein a source of the second MOS transistor and a source of the third MOS transistor are coupled to the drain of the first MOS transistor, a drain of the second MOS transistor is coupled to a first electrode, a gate of the second MOS transistor is coupled to a first dimming pin of the main control chip, a drain of the third MOS transistor is coupled to a second electrode, and a gate of the third MOS transistor is coupled to a second dimming pin of the main control chip.

6. The light tube circuit for switching between emergency lighting and general lighting according to claim 1, further comprising a secondary control chip U3, wherein a linkage control pin of the secondary control chip U3 is coupled to a cooperative control pin of the main control chip, an input terminal of the secondary control chip U3 is connected to multiple keys, and an output terminal of the secondary control chip U3 is connected to the light-emitting element.

7. The light tube circuit for switching between emergency lighting and general lighting according to claim 1, further comprising a circuit breaker, wherein the circuit breaker has a terminal coupled to the mains supply as well as a terminal coupled to a first optical relay, the second transformer coil of the transformer is coupled to a second optical relay, and the first optical relay and the second optical relay are matched and connected with each other.

8. The light tube circuit for switching between emergency lighting and general lighting according to claim 1, further comprising an electric quantity protection module coupled to the battery, wherein the electric quantity protection module is used for detecting an electric quantity of the battery, and when the electric quantity of the battery is lower than a preset threshold, the battery is disconnected from the main control module.

9. A light tube circuit for switching between emergency lighting and general lighting, comprising a main control module, wherein the main control module has a terminal connected to a mains supply and a battery, as well as a terminal connected to a light-emitting element;

the main control module is used for determining whether an input voltage of the mains supply satisfies a desired driving requirement; if so, the main control module controls the light-emitting element to start in a general lighting mode;

if not, the control module controls the light-emitting element to start in an emergency lighting mode with the battery as a driving power supply;

wherein the main control module comprises a main control chip, and the light tube circuit further comprises a secondary control chip U3, wherein a linkage control pin of the secondary control chip U3 is coupled to a cooperative control pin of the main control chip, an input terminal of the secondary control chip U3 is connected to multiple keys, and an output terminal of the secondary control chip U3 is connected to the light-emitting element.

* * * * *